United States Patent
Woodings et al.

(10) Patent No.: US 7,356,635 B2
(45) Date of Patent: Apr. 8, 2008

(54) COMPRESSED REPORT DESCRIPTORS FOR USB DEVICES

(75) Inventors: Ryan Winfield Woodings, Boise, ID (US); Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 160 days.

(21) Appl. No.: 11/222,546

(22) Filed: Sep. 8, 2005

(65) Prior Publication Data
US 2006/0080481 A1    Apr. 13, 2006

Related U.S. Application Data

(60) Provisional application No. 60/612,692, filed on Sep. 24, 2004.

(51) Int. Cl.
*G06F 13/42* (2006.01)
*G06F 13/40* (2006.01)
*G06F 13/10* (2006.01)

(52) U.S. Cl. .......................... 710/311; 710/10
(58) Field of Classification Search ............... None
See application file for complete search history.

(56) References Cited

U.S. PATENT DOCUMENTS 6,311,228 B1 * 10/2001 Ray ........................ 719/321
6,571,305 B1 * 5/2003 Engler ...................... 710/100
7,165,171 B2 * 1/2007 Zhang et al. .................. 713/1
2004/0044807 A1 * 3/2004 Wang et al. .................. 710/5

OTHER PUBLICATIONS

USB Implementers' Forum; "Universal Serial Bus (USB) Device Class for Human Interface Devices (HID)"; USB Implementers' Forum; Version 1.11; Jun. 28, 2001; all pages.*
Compaq, Hewlett-Packard, Intel, Lucent, Microsoft, NEC, Phillips, Universal Serial Bus Specification, Apr. 27, 2000, pp. i-622 (totaling 650 pages), Revision 2.

* cited by examiner

*Primary Examiner*—Paul R. Myers
*Assistant Examiner*—Ryan M Stiglic
(74) *Attorney, Agent, or Firm*—Marger Johnson & McCollom, PC

(57) ABSTRACT

A method and apparatus for creating USB peripheral device report descriptors: A short, compressed, report descriptor is stored in a peripheral device. This short report descriptor is transmitted to a USB wireless bridge and combined with templates stored in the bridge to create a USP report descriptor. Power is saved because less time is required to transmit the short report descriptor than would be required to transmit a full USB report descriptor. Hardware is also saved in the peripheral device since less memory is required to store the short report descriptors as compared to storing a full USB report descriptor.

14 Claims, 3 Drawing Sheets

COMPRESSED REPORT DESCRIPTORS FOR USB DEVICES

RELATED APPLICATION

This application is a non-provisional application of provisional application Ser. No. 60/612,692, filed Sep. 24, 2004. Priority of application 60/612,692 is hereby claimed. The entire contents of application 60/612,692 is hereby incorporated by reference.

FIELD OF THE INVENTION

The present invention relates generally to electronic devices and more particularly to Universal Serial Bus (USB) devices.

BACKGROUND OF THE INVENTION

Peripheral devices (PDs) allow users to interact with a computer. Examples of PDs include keyboards, mice, game controls, joysticks, digitizing pads, etc. PDs are often connected to a computer though an interface called Universal Serial Bus (USB).

USB is a generic computer interface that can connect a multitude of PDs to a single USB port on a computer. A USB equipped computer will auto-detect and auto-configure a PD that is plugged into a USB port. Two versions of USB currently exist. The first version is referred to as USB 1.1, and the second version is referred to as USB 2.0. The specifications for both versions are widely available on the Internet and elsewhere.

USB auto-detection and auto-configuration relies on report descriptors. Report descriptors are stored in USB PDs, and they identify the PD device to the computer operating system. The report descriptors are typically relatively long in order to accommodate as many types of devices as possible.

A conventional computer system may take advantage of wireless technologies for connecting to PDs. IEEE 802.11 "WiFi" and Bluetooth are two popular wireless technologies being used for this purpose. A wireless system will typically use a wireless-to-USB bridge to enable the computer to receive and transmit data with the PD wirelessly. The bridge is generally responsible for communicating with the wireless USB devices and it obtains the report descriptors from the PD and, in turn, sends the report descriptors to the computer.

Many wireless devices are very power sensitive since they run on batteries and power is used every time a wireless transmission occurs. One factor that determines the amount of power required to transmit a report descriptor is the length of the report descriptor. Additionally, the amount of memory required to store a report descriptor in a PD depends on the length of the report descriptor.

SUMMARY OF THE INVENTION

The present invention provides a method and apparatus that utilizes short USB report descriptors instead of full-sized USB report descriptors. The short report descriptors are transmitted from a peripheral device to a USB bridge and combined with one or more templates to create full sized USB report descriptors. It takes less time to transmit a short report descriptor than it takes to transmit a full-size report descriptor, thus saving power. Additionally, less memory space is required in a peripheral device to store short report descriptors, thus reducing hardware cost.

In some embodiments a copy of the short descriptor is stored in a wireless bridge instead of storing the full sized USB report descriptor. This requires less memory in the wireless bridge thus resulting in additional savings in hardware cost.

DETAILED DESCRIPTION

Figure 1:
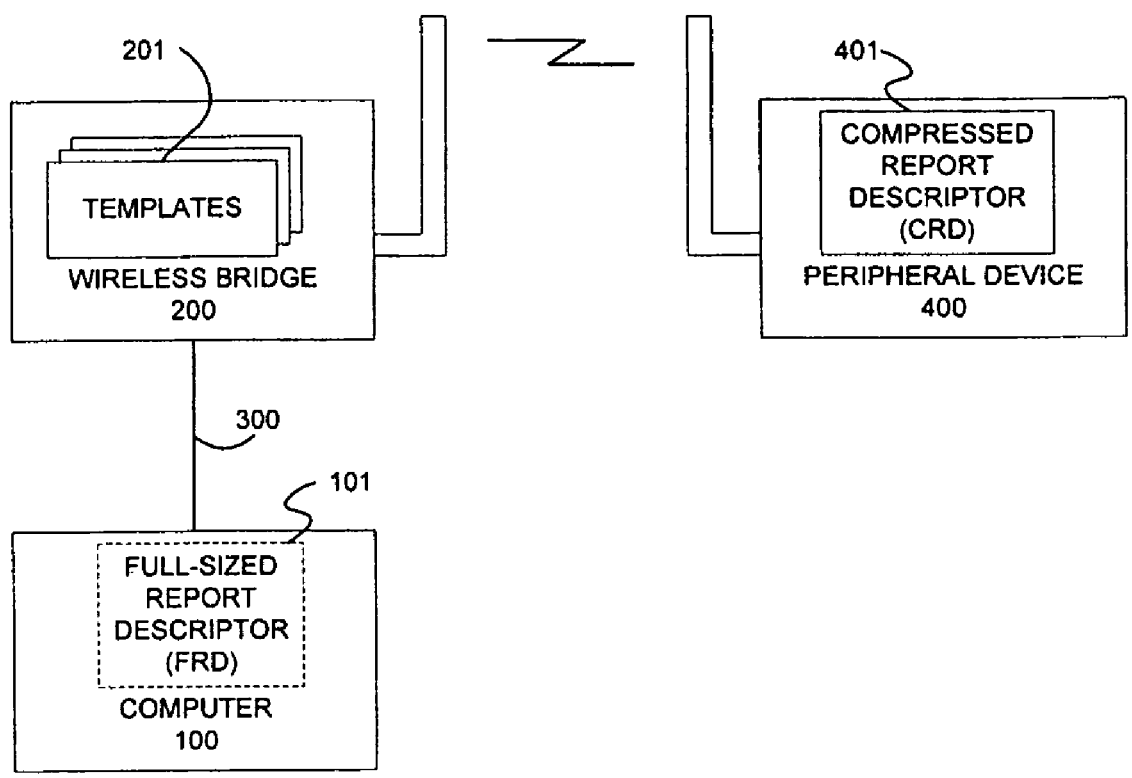
FIG. 1 shows a preferred embodiment using short report descriptors.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

In the following description, the following abbreviations are used:

USB means Universal Serial Bus.

CRD means a short or compressed report descriptor. The adjectives short and compressed are herein used interchangeably to mean a descriptor that is not as long as a standard USB report descriptor.

FRD means a full sized USB report descriptor such as those defined in the USB standard.

PD means a peripheral device.

System Overview: FIG. 1 shows an overview of a first embodiment of the invention. In this first embodiment, a wireless peripheral device 400 is connected to a computer system 100 via a wireless USB bridge 200. As is conventional, an FRD is needed by the computer 100 before the peripheral device 400 can be used.

In the embodiment shown in FIG. 1, a CRD 401 stored in peripheral 400 and a template 201 is stored in bridge 200. The CRD 401 is transmitted to the bridge 200 and combined with the template 201 to create a FRD 101. The FRD 101 is then transmitted to computer 100.

The CRD 401 that is stored in PD 400 is specific to that specific peripheral device and, as will be described later, includes an indication of the templates with which it should be combined. The templates stored in wireless bridge 200 are function specific and device generic as described below.

When PD 400 is activated (or when bridge 200 is plugged into computer 100) the PD 400 wirelessly transmits the CRD 401 to wireless bridge 200. Wireless bridge 200 utilizes the CRD 401 and the templates 201 to create the FRD 101. The CRD 401 includes template indicators which indicate which templates 201 should be combined with the CRD 401. After the FRD 101 is created by the wireless bridge, it is sent to computer 100 on connection 300. Computer 100 then utilizes the FRD 101 in a conventional manner.

Figure 2:
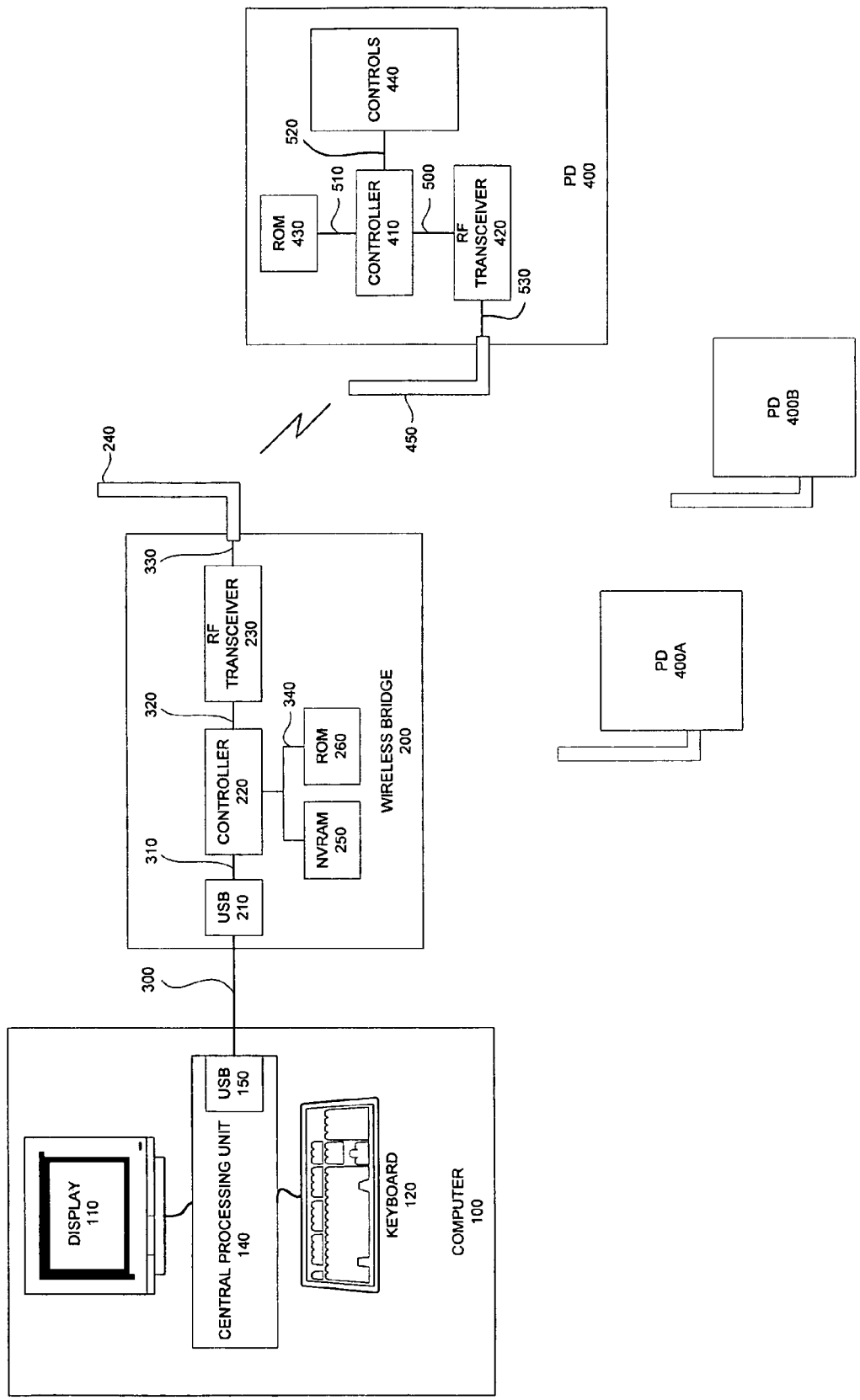
FIG. 2 shows a more detailed diagram of the preferred embodiment.

FIG. 2 shows a more detailed diagram of the preferred embodiment. As shown in FIG. 2, computer 100 is connected to PDs 400, 400A and 400B using a wireless connection. The PDs 400, 400A, and 400B can, for example, be conventional wireless devices such as, a mouse, a joystick, or a keyboard. Three PDs are shown as a representative number of PDs. Other embodiments use more or less than 3 PDs. With respect to the present invention, the PDs 400, 400A and 400B function in a similar manner, so only PD 400 will be described in detail.

The computer 100 includes a display 110, a keyboard 120, and a central processing unit (CPU) 140. The display 110, keyboard 120, and CPU 140 are conventional and generally perform the functions of a conventional computer system. The CPU 140 has a Universal Serial Bus (USB) interface 150, which enables communication with the wireless bridge 200 using connection 300.

Wireless bridge 200 includes a USB interface 210, a controller 220, an RF transceiver 230, an antenna 240, a non-volatile random access memory (NVRAM) 250, and a read-only memory (ROM) 260. USB interface 210 enables bi-directional communications between computer 100 and controller 220 on connection 310. Such communication is conventional.

Controller 220 controls the flow of information through the wireless bridge 200 and performs housekeeping functions as needed in a conventional manner. RF transceiver 230 modulates data received from controller 220 on connection 320 onto a radio frequency (RF) carrier for broadcast on antenna 240 using connection 330. RF transceiver 230 also demodulates RF signals received on antenna 240 using connection 330 and forwards the demodulated data to controller 220 on connection 320. NVRAM 250 and ROM 260 are memory devices connected to controller 220 by connection 340.

NVRAM 250 stores the CRDs that are received from the wireless PD devices communicating with the wireless bridge 200. ROM 260 stores the descriptor templates that are needed by controller 220 to "uncompress" the report descriptors. CRDs will be discussed in more detail later. An alternate embodiment uses NVRAM 250 to store the descriptor templates instead of ROM 260.

PD 400 includes a controller 410, an RF transceiver 420, a ROM 430, controls 440, and an antenna 450. Controller 410 controls the flow of information through PD 400 and performs housekeeping functions as needed. RF transceiver 420 modulates data received from controller 410 on connection 500 onto a radio frequency carrier for broadcast on antenna 450 using connection 530. RF transceiver 420 also demodulates RF signals received on antenna 450 using connection 530 and forwards the demodulated data to controller 410 on connection 500.

ROM 430 is a memory device connected to controller 410 by connection 510 and it stores the CRD related to PD 400. Other embodiment can use any other conventional type of non-volatile memory in place of ROM 430. Controls 440 is are connected to controller 410 by connection 520. Controls 440 are conventional PD input devices. They can include devices such as a pushbutton, scroll wheel, microphone, video camera, etc. Such controls generate data for transmission to the computer 100.

Report Descriptors: The following is an example of a conventional full USB report descriptor (i.e. a FRD) for a conventional computer mouse.

```
USAGE_PAGE:     Generic Desktop
USAGE:          Mouse
COLLECTION:     Application
USAGE:          Pointer
COLLECTION:     Physical
    USAGE_PAGE:         Button
    REPORT_ID:              1
    REPORT_COUNT:           3
    REPORT_SIZE: 1
    USAGE_MINIMUM:          1
    USAGE_MAXIMUM:          3
    LOGICAL_MINIMUM:        0
    LOGICAL_MAXIMUM:        1
    INPUT:          Data, Var, Abs
    REPORT_COUNT:           1
    REPORT_SIZE:    5
    INPUT:          Const
    USAGE:          X
    USAGE:          Y
    REPORT_COUNT:           2
    REPORT_SIZE:    8
    USAGE_PAGE:     Generic Desktop
    LOGICAL_MINIMUM: -127
    LOGICAL_MAXIMUM: 127
    INPUT:          Data, Var, Rel
END_COLLECTION
COLLECTION:     Physical
    USAGE:          Wheel
    REPORT_COUNT:           1
    REPORT_SIZE:    8
    USAGE_PAGE:     Generic Desktop
    LOGICAL_MINIMUM: -127
    LOGICAL_MAXIMUM: 127
    INPUT:          Data, Var, Rel
END_COLLECTION
END_COLLECTION
```

A CRD is shorter than a FRD. Each CRD is based on the characteristics of a specific device. A CRD is relatively short and it only includes the device specific information related to a specific device. As a specific example, the following is a CRD for a computer mouse:

```
USAGE_PAGE:     Generic Desktop
USAGE:          Mouse
COLLECTION:     Application
USAGE:          Pointer
COLLECTION:     Physical
    DIGITAL INPUT
    USAGE_PAGE:     Button
    COUNT:              3
    8-BIT ANALOG
    USAGE:          X
    USAGE:          Y
END_COLLECTION
COLLECTION:     Physical
    8-BIT ANALOG
    USAGE:          Wheel
END_COLLECTION
END_COLLECTION
```

A CRD differs in two significant ways from a FRD. First, there is much less information in the CRD than in a FRD. Only a few variables are represented in a CRD. Second, the CRD adds template indicators to identify the templates needed to generate the FRD. The template indicators in the mouse CRD shown above are DIGITAL INPUT and 8-BIT ANALOG. These template indicators are used to determine which templates should be used to expand a CRD into a FRD.

Comparing the CRD for a mouse given above with the FRD given above shows the dramatic reduction in size made possible by using a CRD instead of a FRD. Power savings can be achieved by using the CRD since the time it takes to transmit the CRD from the PD to the wireless bridge is less than that for the FRD; hence the transmitter utilizes less power if a CRD is used instead of the FRD.

The computer operating system requires the full USB report descriptor in order to identify the PD. Thus, the CRD must be converted into a full USB report descriptor before it can be used by computer 100.

The wireless bridge 200 is responsible for converting the CRD into the full report descriptor. This is accomplished by utilizing the templates 201 stored in the wireless bridge. The templates are used in combination with the CRD to generate the FRD. The FRD is then sent to the computer. The system designer writes the templates based on the needs of the system.

In the preferred embodiment CRD for a mouse (given above) has two template indicators. Namely, the template indicators DIGITAL INPUT and 8-BIT ANALOG. Thus, in the embodiment described here, two templates are used to create the FRD.

These templates are "DIGITAL INPUT" and "8-BIT ANALOG". These templates are as follows:

| TEMPLATE FOR 'DIGITAL INPUT' | |
|---|---|
| REPORT COUNT: | <count> |
| REPORT SIZE: | 1 |
| USAGE MINIMUM: | 1 |
| USAGE MAXIMUM: | <count> |
| LOGICAL MINIMUM: | 0 |
| LOGICAL MAXIMUM: | 1 |
| INPUT: | Data, Var, Abs |
| REPORT COUNT: | 1 |
| REPORT SIZE: | 8 − <count> |
| INPUT: | Constant |
| TEMPLATE FOR '8-BIT ANALOG' | |
| REPORT COUNT: | <numusages> |
| REPORT SIZE: | 8 |
| USAGE PAGE: | Generic Desktop |
| LOGICAL MINIMUM: | −127 |
| LOGICAL MAXIMUM: | 127 |
| INPUT: | Data, Var, Rel |

Figure 3:
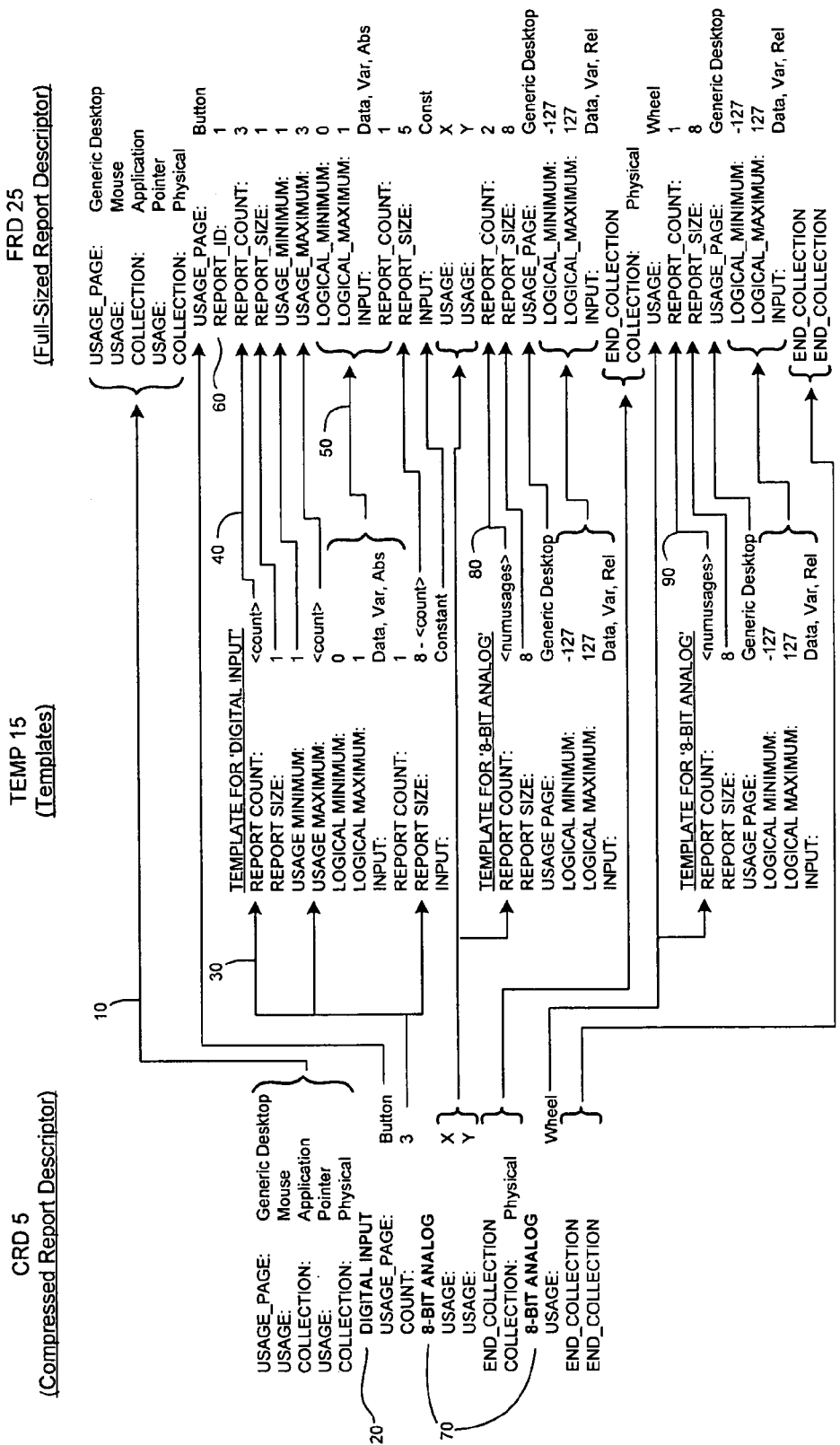
FIG. 3 shows how a short report descriptor and templates can be used to reconstruct the report descriptor.

These templates are used in conjunction with the CRD to create the FRD. FIG. 3 shows how the CRD is combined with the templates to create the FRD in the preferred embodiment. The left side of FIG. 3 shows CRD 5, the middle of the figure shows the templates TEMP 15 and the right side shows the full report descriptor FRD 25.

The actual process of reconstructing the report descriptor requires several steps. One step copies information from CRD 5 straight into FRD 25. Item 10 exemplifies this procedure whereby USAGE-PAGE, USAGE, and COLLECTION information is directly ported to the report descriptor. A second step utilizes the templates to generate information for the report descriptor with the CRD containing template indicators to identify which templates to use when reconstructing the report descriptor. Template indicators 20 DIGITAL INPUT and 70 8-BIT ANALOG are examples of this.

The templates themselves utilize two procedures to generate the content of the report descriptor. The first procedure is to take variable information from the CRD and combine it with information in the template to create the content for the FRD. Item 30 shows this procedure whereby CRD 5 variable COUNT (value of 3) is used by TEMP 15 template for 'DIGITAL INPUT' to calculate REPORT COUNT. Item 40 shows the result of these two items being combined to create REPORT_COUNT: 3 in FRD 25. Additionally, item 30 shows COUNT being used by TEMP 15 template 'DIGITAL INPUT' to calculate USAGE MAXIMUM and REPORT SIZE (with REPORT SIZE being calculated by subtracting the COUNT value from 8, which in this case results in 5).

The second procedure utilized by the templates for generating the content of the report descriptor is to just copy information from the templates to the report descriptor. Item 50 exemplifies this procedure whereby LOGICAL MINIMUM, LOGICAL MAXIMUM, INPUT, and REPORT COUNT are directly ported to FRD 25 from temp 15 template 'DIGITAL INPUT.'

CRD 5 also uses template indicator 70 8-BIT ANALOG in two places. Even though the same template is used twice the variables used by each instance are different. The first instance has variables USAGE: X and USAGE:Y, while the second instance has a single variable USAGE: Wheel. These variables change the resulting decompressed report descriptor as can be seen by items 80 and 90 whereby REPORT COUNT of TEMP 15 template '8-BIT ANALOG' is created based on the number of usages in CRD 5. For item 80 there are two usages (USAGE: X and USAGE: Y) thereby creating REPORT_COUNT: 2 in FRD 25, and for item 90 there is a single usage (USAGE: Wheel) thereby creating REPORT_COUNT: 1 in FRD 25.

Item 60 REPORT_ID is a generated identification number. Report_IDs are sequential numbers that start at 0 for the first report. The Report ID is just an identifier. There is nothing special about a specific report ID as long as the report ID listed in the descriptor matches the report ID sent in the actual data packets as is conventional.

The previous example only required the use of two templates—DIGITAL INPUT and 8-BIT ANALOG. Other templates can be used when other functions are required. Preferred embodiments of templates for other functions to include KEYBOARD STANDARD KEYS, KEYBOARD CONSUMER KEYS, DIGITAL OUTPUT, and HAT SWITCH (i.e. the rotating thumb switch on the top of a joystick) are as follows:

| KEYBOARD STANDARD KEYS | |
|---|---|
| USAGE PAGE: | Key Codes |
| REPORT SIZE: | 8 |
| REPORT COUNT: | 6 |
| LOGICAL MINIMUM: | 0 |
| LOGICAL MAXIMUM: | 255 |
| USAGE MINIMUM: | 0 |
| USAGE MAXIMUM: | 255 |
| INPUT: | Data, Array |
| KEYBOARD CONSUMER KEYS | |
| USAGE PAGE: | Consumer Devices |
| USAGE: | Consumer Control |
| REPORT SIZE: | 16 |
| REPORT COUNT: | 1 |
| LOGICAL MINIMUM: | 0 |
| LOGICAL MAXIMUM: | 572 |
| USAGE MINIMUM: | 0 |
| USAGE MAXIMUM: | 572 |
| INPUT: | Data, Array, Abs |
| DIGITAL OUTPUT | |
| REPORT SIZE: | 1 |
| REPORT COUNT: | <count> |
| USAGE MINIMUM: | 1 |

-continued

| | |
|---|---|
| USAGE MAXIMUM: | <count> |
| INPUT: | Data, Var, Abs |
| REPORT COUNT: | 1 |
| REPORT SIZE: | 8-<count> |
| OUTPUT: | Constant |
| HAT SWITCH | |
| USAGE: | Hat Switch |
| REPORT SIZE: | <count> |
| REPORT COUNT: | 1 |
| LOGICAL MINIMUM: | 0 |
| LOGICAL MAXIMUM: | <count>-1 |
| UNIT: | Degrees |
| INPUT: | Data, Var, Abs, Null |

The preferred embodiments for a CRD, a FRD, and templates as described above represents only one possible embodiment. Other embodiments are possible. For example, one alternate embodiment includes more information in the CRD in order to minimize the process of combining the CRD with the templates to create the report descriptor. The possible combinations and permutations of the CRD, templates and FRD are great, as well as are the procedures to combine the CRD and the templates. The improved method and apparatus described herein is not limited to just a mouse PD as shown in the preferred embodiment, but applies to any other PD or device that uses a report descriptor, wireless or not.

System Operation: The manner that the system of FIG. 2 utilizes the method of FIG. 3 to create the FRD will now be described. The system is initialized so that PD 400 contains CRD 5 in ROM 430, and wireless bridge 200 containing one copy of each of the templates in TEMP 15 (i.e. one copy of template DIGITAL INPUT and one copy of template 8-BIT ANALOG) in ROM 260. This initialization is done in a conventional manner.

On first power up of PD 400 or when PD 400 is first brought within range of wireless bridge 200, controller 410 retrieves CRD 5 from ROM 430 using connection 510 and sends it to RF transceiver 420 using connection 500. RF transceiver modulates CRD 5 onto an RF carrier then transmits the resultant RF signal over antenna 450 using connection 530.

Wireless bridge 200 is a receiver that receives the RF signal from PD 400 on antenna 240. The RF signal is sent to RF transceiver 230 using connection 330 where it is demodulated to recover CRD 5. The recovered CRD 5 is sent to controller 220 on connection 320. Controller 220 stores CRD 5 in NVRAM 250. Controller 220 then reconstructs FRD 25 using the same procedures as described above in the FIG. 3 description to combine the CRD 5 with templates TEMP 15 to create the FRD25. As controller 220 is generating FRD 25 it is simultaneously being sent to USB interface 210 using connection 310 where it is sent to computer 100 using connection 300 and USB interface 150. In an alternate embodiment controller 220 generates the complete FRD 25 and stores it in scratchpad random access memory (not shown) before it is sent to the computer 100.

PD 400 does not need to send CRD 5 in subsequent situations where the operating system of the computer 100 requires FRD 25, such as when the computer is powered off and on, or when PD 400 is powered off and on. Instead, wireless bridge 200 can recognize the presence of PD 400 and self-generate FRD 25 for it by using the previously stored CRD 5 in NVRAM 250 and the templates TEMP 15 stored ROM 250. Utilizing this procedure saves time in generating FRD 25 as well as power in not requiring PD 400 to send CRD 5 a second time. This approach also saves NVRAM in wireless bridge 200 since only CRD 5 is stored in NVRAM and not the whole FRD 25.

The foregoing description for an improved method and apparatus for Compressed Report Descriptors for USB Devices describes a specific embodiment; however, other embodiments are also possible that take advantage of the inventive principles of compressed, that is, short report descriptors.

For example, in one alternative embodiment the wireless bridge is 'controller-less'. In such an embodiment the processing power of computer 100 is used to replace the functions of the controller 220. The resources of computer 100 could also replace NVRAM 250 and ROM 260, thus making the wireless bridge 200 nothing more than a transceiver.

It is noted that the preferred embodiment uses a CRD for a computer mouse. This is merely one example of a CRD. Other PDs use other CRDs and other templates.

While the invention has been shown and described with respect to preferred embodiments thereof, it should be understood that a wide variety of other embodiments are possible without departing from the scope and sprit of the invention. The scope of the invention is only limited by the appended claims.

We claim:

1. A method for creating a full sized USB report descriptor for a USB peripheral device comprising:
   obtaining a short report descriptor from said peripheral device, said short report descriptor including at least one template indicator; and
   combining said short report descriptor with at least one template indicated by said template indicator to create a full-sized USB report descriptor for said device.

2. The method of claim 1, wherein said USB peripheral device is connected to a USB wireless bridge and said template is stored in said USB wireless bridge.

3. The method of claim 2 wherein said short report descriptor is transmitted to said wireless bridge and said short report descriptor is combined with said template in said wireless bridge to create said, full-sized USB report descriptor.

4. The method of claim 1, wherein said short report descriptor is stored in the device in non-volatile memory.

5. The method of claim 1, wherein said template is stored in non-volatile memory in a bridge.

6. The method of claim 1, further comprising saving said short report descriptor in a bridge in non-volatile memory after being received from said peripheral device.

7. The method of claim 3 said recited short report descriptor is a first short report descriptor and said method further comprising sending a second short report descriptor from a second device to said bridge, said second short report descriptor containing the same template indicator as in said first short report descriptor, said second short report descriptor being different from said first short report descriptor.

8. The method of claim 6, further comprising creating the full-sized report descriptor a second time based in part on the short report descriptor stored in non-volatile memory.

9. A wireless USB system comprising:
   a wireless USB device adapted to transmit a short report descriptor;
   a wireless USB bridge adapted to receive said short report descriptor and to create a full-sized USB report descriptor for said device based in part on said compressed report descriptor; and
   a computer adapted to receive said full-sized report descriptor from said wireless USB bridge.

10. The system of claim 9, wherein said wireless USB bridge creates the full-sized report descriptor based in part on a template identified by a template indicator contained within said short report descriptor.

11. The system of claim 9, wherein said short report descriptor is stored in said wireless device in non-volatile memory.

12. The system of claim 10, wherein said template is stored in said wireless bridge.

13. The system of claim 9, wherein said wireless bridge stores the compressed report descriptor in non-volatile memory located within the wireless bridge.

14. The system of claim 11, wherein the wireless bridge creates a second full-sized report descriptor based in part on the short report descriptor stored in said non-volatile memory.

* * * * *